Fig-2-

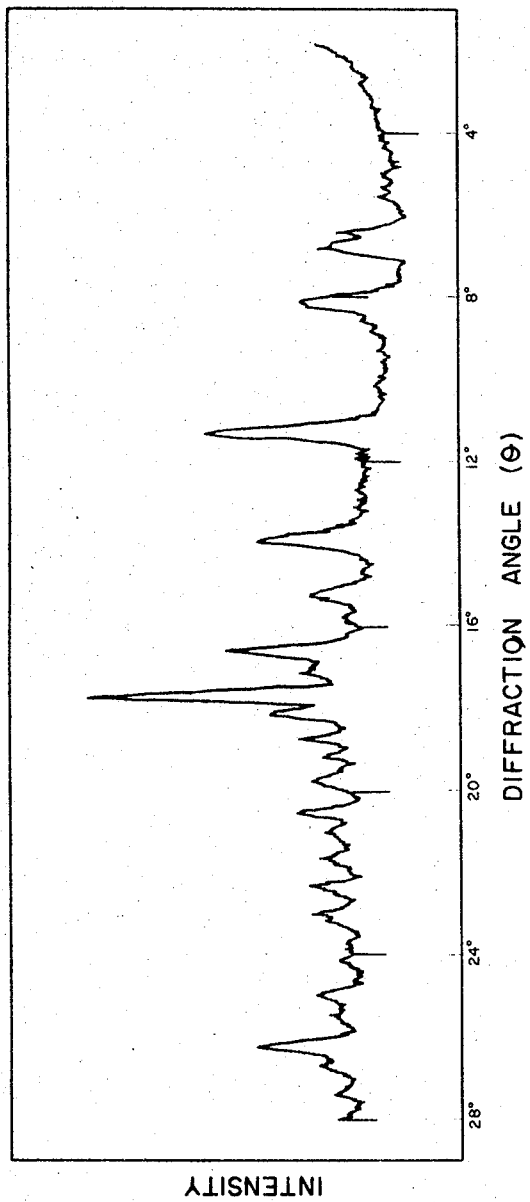

United States Patent Office 3,462,527
Patented Aug. 19, 1969

3,462,527
FUNGICIDAL COMPOSITIONS OF BASIC COPPER SULFATE
Hideo Tanabe, Nishinomiya, and Yasuo Sano, Kawanishi, Japan, assignors to Takeda Chemical Industries, Ltd., Osaka, Japan
Continuation of application Ser. No. 390,786, Aug. 18, 1964. This application Nov. 7, 1966, Ser. No. 596,044
Claims priority, application Japan, Aug. 20, 1963, 38/44,402
Int. Cl. A01n *11/04;* C01g *3/10, 1/10*
U.S. Cl. 424—128                                                    4 Claims

ABSTRACT OF THE DISCLOSURE

Fungicidal compositions comprising as their essential ingredient a new basic copper sulfate are disclosed that have a broad spectrum of antifungal activity. Said basic copper sulfate is characterized by having the following lattice spacing:

Figure 1:
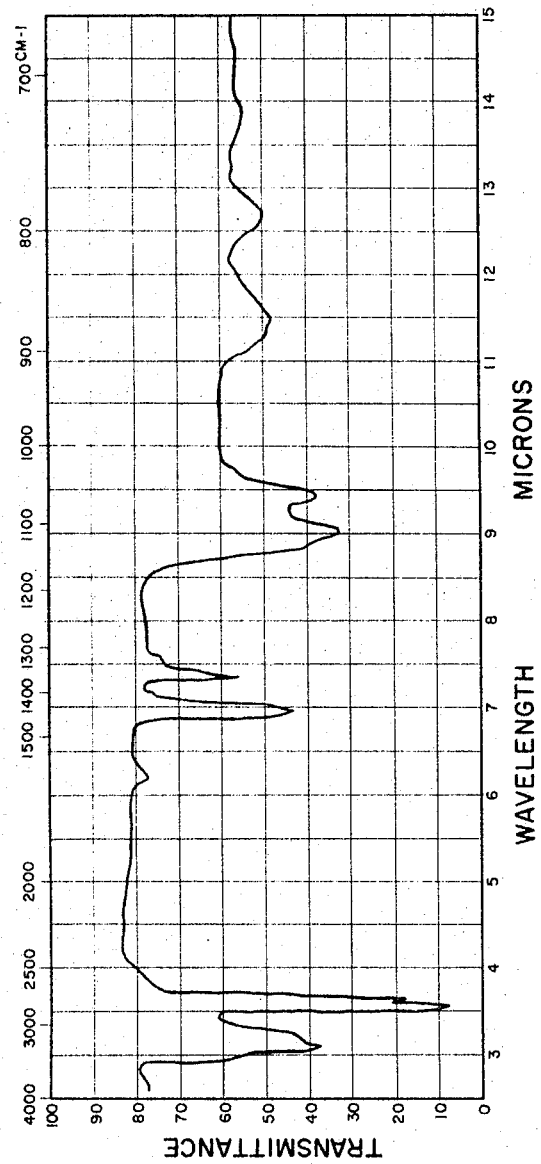

Angstrom:
| | |
|---|---|
| 6.95 | Very strong |
| 3.47 | Middle |
| 2.70 | Middle |
| 2.62 | Middle |
| 2.42 | Middle |
| 2.33 | Middle |
| 2.26 | Middle |
| 2.02 | Middle |
| 1.99 | Middle |
| 1.54 | Weak |

---

This application is a continuation of application Ser. No. 390,786, filed Aug. 18, 1964, and now abandoned.

This invention relates to novel basic copper sulfate represented by the formula, $Cu_4(OH)_6SO_4 \cdot H_2O$, and a method for preparing the same, which comprises reacting copper sulfate with an alkali hydroxide in the presence of phosphoric anion donor, and to novel compositions containing the said basic copper sulfate and basic copper phosphate.

As naturally occurring basic copper sulfate, brochantite and langite, though the amounts are very small, have been known. Further basic copper sulfates which are of the same crystal structure as that of brochantite have been prepared by reacting copper sulfate with alkali hydroxide.

As a result of an extensive investigation on copper compounds, the present inventors have succeeded in preparing a novel basic copper sulfate which shows stronger germicidal action than hitherto known basic copper sulfates against various kinds of microorganisms causing plant diseases. From further study, it has been clarified that the basic copper sulfate is represented by the formula $Cu_4(OH)_6SO_4 \cdot H_2O$.

The first object of this invention is to provide a novel basic copper sulfate which is represented by the formula $Cu_4(OH)_6SO_4 \cdot H_2O$ and has distinct characteristics differentiating it from hitherto-known basic copper sulfate. The second object of this invention is to provide a novel composition consisting of said novel basic copper sulfate and basic copper phosphate. Another object is to provide a method for preparing the novel basic copper sulfate. Further object is to provide a novel germicidal composition containing the novel basic copper sulfate. Hereinafter, the basic copper sulfate represented by the formula $$Cu_4(OH)_6SO_4 \cdot H_2O$$

is referred to as "basic copper sulfate of this invention."

The following table shows the result of the respective X-ray diffractions of the basic copper sulfate of this invention, langite and brochantite-type basic copper sulfate.

TABLE

| Basic copper sulfate of this invention lattice spacings (angstrom) | Brochantite-type basic copper sulfate lattice spacings (angstrom) | Langite lattice spacings* (agnstrom) |
|---|---|---|
| 6.95 (very strong) | 6.51 (middle) | 7.21 (very strong). |
| 3.47 (middle) | 5.44 (middle) | 3.56 (strong). |
| 2.70 (middle) | 3.92 (strong) | 2.80 (weak). |
| 2.62 (middle) | 3.21 (middle) | 2.60 (middle). |
| 2.42 (middle) | 2.93 (weak) | 2.49 (strong). |
| 2.33 (middle) | 2.70 (strong) | 2.20 (middle). |
| 2.26 (middle) | 2.52 (very strong) | 2.13 (middle). |
| 2.02 (middle) | 2.47 (weak) | 1.81 (weak). |
| 1.99 (middle) | 2.19 (weak) | 1.77 (middle). |
| 1.54 (weak) | 1.75 (middle) | 1.59 (weak). |

\* Bull. Soc. Franc. Minér. Crist. 81 257 (1958).

As is shown in the table, it is clear that the basic copper sulfate of this invention has different crystalline structure from any of the known langite or brochantite (brochantite-type basic copper sulfate).

The method of this invention comprises allowing copper sulfate to react with alkali hydroxide in the presence of phosphoric anion donor.

As the alkali hydroxide, there may, for example, be used sodium hydroxide, potassium hydroxide and ammonium hydroxide. As the phosphoric anion donor, there may be employed phosphoric acid or a compound wherein one, two or three hydrogens of phosphoric acid are replaced with alkali e.g. sodium, potassium, ammonium, etc. Generally, the employment of trialkali phosphate may be most preferable from the viewpoint that the product is obtained as crystal.

In the method of this invention, the ratio of the starting material usually exerts considerable influence upon yield or purity of the basic copper sulfate of this invention.

That is, when trialkali salt of phosphoric acid and alkali hydroxide are employed in mols of 0.03 and 1.5, respectively relative to one mol of copper sulfate, the product is only the objective basic copper sulfate of this invention. However, when copper sulfate and alkali hydroxide are employed in the same molar ratio as the above-mentioned relation, but the trialkali phosphate is employed in a molar ratio smaller than 0.002 relative to one molar of copper sulfate, the product is contaminated with brochantite-type basic copper sulfate, or the product is only brochantite-type basic copper sulfate; while, when the molar ratio of trialkali phosphate is larger than 0.1 relative to one mol of copper sulfate, the basic copper sulfate of this invention in amorphous form is produced. Further, when copper sulfate and trialkali phosphate are employed in the same molar ratio as mentioned above, i.e. 1:0.03, but the molar ratio of alkali hydroxide is smaller than 1.4 relative to one mol of copper sulfate, brochantite-type basic copper sulfate is produced together with the objective basic copper sulfate of this invention. However, in the case that the employment of alkali hydroxide is smaller, pure objective basic copper sulfate of this invention is obtainable by increasing the molar ratio of trialkali phosphate.

For example, when trialkali phosphate and alkali hydroxide are employed respectively in molar amounts of 0.05–0.07 and 1.4 relative to one mol of copper sulfate, the product is almost the objective basic copper sulfate of this invention only. On the contrary, in case where the molar ratio of alkali hydroxide is large (for example, the molar ratio of copper sulfate, trialkali phosphate and alkali hydroxide being 1:0.02:1.6), the product is changed to black during its drying at 100° C. and presumed to contain copper hydroxide. Generally speaking, it is most preferable to employ 0.002–0.1 mol of trialkali phosphate and 1.5–1.4 mols of alkali hydroxide relative to one mol of copper sulfate. When free phosphoric acid, or its mono or dialkali salt is employed in place of trialkali salt of phosphoric acid, it is preferable to increase the amount of an alkali hydroxide in the above mentioned ratio corresponding to the amount required for converting the phosphoric acid or its mono- or dialkali salt into trialkali phosphate. The reaction may preferably be carried out at a temperature around room temperature with or without stirring. Generally, the existence of suitable solvent, e.g. water may result in a desirable effect in the reaction. In general the reaction may preferably be carried out by adding alkali hydroxide and copper sulfate simultaneously to phosphoric acid or its salt. More concretely, the reaction is preferably carried out by adding a solution of copper sulfate and a solution of alkali hydroxide simultaneously to a solution of phosphoric acid or its salt at the same rate at a temperature around room temperature. As the objective basic copper sulfate of this invention is insoluble in water, the employment of water as a solvent is especially preferable in view of the procedure for the recovery of the basic copper sulfate of this invention, etc.

It is presumed that, in the above-mentioned reaction basic copper phosphate is first formed, and thus formed basic copper phosphate stimulates the crystallization of the basic copper sulfate represented by the formula $$Cu_4(OH)_6SO_4 \cdot H_2O$$

and the crystallization of the basic copper sulfate continues irrespective of the presence of the basic copper phosphate. In other words, the crystallization of the basic copper sulfate represented by the formula $$Cu_4(OH)_6SO_4 \cdot H_2O$$

is not started without the presence of basic copper phosphate, though the presence of basic copper phosphate is not necessarily required after the crystallization of the basic copper sulfate begins.

It may not necessarily be required from the viewpoint of practical use to separate the basic copper sulfate represented by the formula $Cu_4(OH)_6SO_4 \cdot H_2O$ from basic copper phosphate. A composition consisting of the basic copper sulfate and basic copper phosphate may sufficiently be utilizable as a germicide of this invention. Ratios of the components may vary with the ratio of the starting materials employed. However, in general, the composition comprises the following ratios:

| | Weight percent |
|---|---|
| Cu | 51–57 |
| $SO_4$ | 7–21 |
| $PO_4$ | 0.15–9 |
| OH | 22–26 |
| $H_2O$ | 2–4 |

Brochantite-type copper sulfate has been known to have germicidal effect. However, the germicidal effect is rather weak. Further, brochantite-type basic copper sulfate shows its germicidal effect against only limited microorganisms causing plant diseases. For example, brochantite-type basic copper sulfate has no effect against powdery mildew of cucumber, vegetables; while the basic copper sulfate of this invention shows its excellent germicidal effect in wider scope, e.g. late blight of cucumber, downy mildew of cucumber, anthracnose of cucumber, powdery mildew of cercospora, leaf spot of sugar beet, leaf mould of tomato, black spot of rose, stem end rot, scab, etc. while showing little phytotoxicity. Bordeaux index of the basic copper sulfate of this invention is about 0.622, while that of brochantite-type basic copper sulfate is about 0.272.

The following are the experiments of presently preferred embodiments showing the germicidal effect of the basic copper sulfate of this invention. In the experiments, (A) and (B) are comopsitions consisting of the basic copper sulfate represented by the formula $$Cu_4(OH)_6SO_4 \cdot H_2O$$

as the active ingredient and basic copper phosphate. Ratios of the components of (A) and (B) are as follows:

(A) $Cu:OH:SO_4:PO_4=4:6:0.82:0.12$ (the molar ratio)

(B) $Cu:OH:SO_4:PO_4=4:6:0.91:0.06$ (the molar ratio)

In the experiments, (A) and (B) are applied to plants in a form of suspension having a concentration of 575 μg./ml., 383 μg./ml. and 288 μg./ml. calculated as copper, respectively.

Experiment 1.—Effect on anthracnose of cucumber

Method for test:

*Colletotrichum lagenarium* Ellis et Halsted is incubated on a potato-agar medium at 25° C. for 3 days. Then, conidia are suspended in water in a rate of $8–10 \times 10^5$/ml.

Cucumber variety Su-yo reared in a pot of 9 cm. diameter is employed. The test is repeated 2 times by employing 5 pots per one plot.

10 ml./pot of the suspension of (A) or (B) is sprayed onto the cucumber. Then, 3 ml./pot of the suspension of conidia prepared above is inoculated on the cucumber treated with the suspension of (A) or (B), after the cucumber has dried. 7 days after, the number of the all lesions occurring in the leaves is measured.

As the control, cucumber which is treated in the same ways as mentioned above except no treatment with the suspension of (A) or (B) is observed.

Result:

| | Concentration (μg./ml.) of the suspension of (A) or (B) (calculated as Cu) | Number of leaves tested | Number of all the lesions in the leaves | Morbidity rate* (percent) |
|---|---|---|---|---|
| Treated plot: | | | | |
| (A) | 575 | 10 | 285 | 29 |
| | 383 | 10 | 374 | 38 |
| | 288 | 10 | 423 | 43 |
| (B) | 575 | 10 | 305 | 31 |
| | 383 | 10 | 482 | 49 |
| | 288 | 10 | 482 | 49 |
| Non-treated plot | | 10 | 984 | 100 |

*M rate = $\dfrac{\text{Number of lesions in the treated plot}}{\text{Number of lesions in the non-treated plot}} \times 100$ Experiment 2.—Effect on downy mildew of cucumber Method for test:

*Pseudoperonospora cubensis* (Berkeley et Curtis) Rostow are collected from lesions occurring in leaves of cucumber spontaneously. Then, the suspension of conidia ($8–10 \times 15^5$/ml.) is prepared.

Cucumber variety Su-yo reared in a pot of 9 cm. diameter is employed for the test. The test is repeated 2 times by employing 5 pots per one plot.

The suspension of (A) or (B) is sprayed onto the cucumber in a rate of 10 ml./pot. Then, 2–3 ml. of the suspension of conidia prepared above is inoculated on thus treated cucumber, after the cucumber is dried. 7 days after the inoculation, the number of all lesions occurring in the leaves are measured.

As the control, cucumber which is treated in the same way as mentioned above but not treated with the suspension of (A) or (B), is employed.

Result:

| | Concentration ($\mu$g./ml.) of the suspension of (A) or (B) (calculated as Cu) | Number of all the lesions in the leaves | Morbidity rate* (percent) |
|---|---|---|---|
| Treated plot: | | | |
| (A) | 575 | 229 | 40 |
| | 383 | 257 | 45 |
| | 288 | 257 | 45 |
| (B) | 575 | 229 | 40 |
| | 383 | 292 | 51 |
| | 288 | 292 | 51 |
| Non-treated plot | | 572 | 100 |

*Morbidity rate = $\dfrac{\text{Number of lesions in the treated plot}}{\text{Number of lesions in the non-treated plot}} \times 100$ Experiment 3.—Effect on powdery mildew of cucumber Method for test:

*Erysiphe cichoracearum* DC is collected from lesions occuring in leaves of cucumber spontaneously. Then the suspension of conidia (8–10×10$^5$/ml.) is prepared.

Cucumber variety Su-yo reared in a pot of 9 cm. diameter is employed for the test. The test is repeated 2 times by employing 5 pots per one plot.

The suspension of (A) or (B) is sprayed onto the cucumber in a rate of 10 ml./pot. Then, on thus treated cucumber, 2–3 ml. of the suspension of conidia is inoculated, after the cucumber is dried. 7 days after, the morbidity degree in leaves is measured.

Result:

| | Concentration ($\mu$g./ml.) of the suspension of (A) or (B) (calculated as Cu) | Number of leaves tested | Morbidity degree* (percent) |
|---|---|---|---|
| Treated-pot: | | | |
| (A) | 575 | 10 | 0 |
| | 383 | 10 | 0 |
| | 288 | 10 | 0 |
| (B) | 575 | 10 | 0 |
| | 383 | 10 | 0 |
| | 288 | 10 | 0 |
| Non-treated plot | | 10 | 42 |

*Morbidity degree = $\left\{ \Sigma \dfrac{(f) \times \text{number of leaves}}{\text{Number of leaves tested}} \right\} \times 100$ (f) 0—No lesion per one leaf.
(f) 1—Area of lesion is up to 20%.
(f) 2—Area of lesion is more than 20% and up to 50% relative to an area of one leaf.
(f) 3—Area of lesion is more than 50% relative to an area of one leaf.

Experiment 4.—Effect on late blight of tomato

Method for test:

*Phytophthora infestant* (Mont.) de Bary is incubated on a sterilized slice of potato at 28° C. for 10 days. Then conidia is suspended in a water in a rate of 8–10×10$^5$/ml.

50 ml./pot of the suspension of (A) or (B) is sprayed onto the tomato variety Ponderosa which was reared in a pot of 1/5000 are for 2 months. Then, on thus treated tomato 10 ml./pot of the suspension of conidia is inoculated, after the tomato is dried. 7 days after the inoculation, the morbidity degree in the upper 5 leaves is measured.

Result:

| | Concentration ($\mu$g./ml.) of the suspension of (A) or (B) | Number of leaves tested | Morbidity degree* (percent) |
|---|---|---|---|
| Treated-plot: | | | |
| (A) | 575 | 30 | 35 |
| | 383 | 30 | 39 |
| | 288 | 30 | 45 |
| (B) | 575 | 30 | 14 |
| | 383 | 30 | 46 |
| | 288 | 30 | 50 |
| Non-treated plot | | 30 | 100 |

*Morbidity degree = $\left\{ \Sigma \dfrac{(f) \times \text{number of leaves}}{\text{Number of leaves tested}} \right\} \times 100$ (f) 0—No lesion per one leaf.
(f) 1—Area of lesion is up to 20% relative to an area of one leaf.
(f) 2—Area of lesion is more than 20% and up to 40% relative to an area of one leaf.
(f) 3—Area of lesion is more than 40% and up to 60% relative to an area of one leaf.
(f) 4—Area of lesion is more than 60% and up to 80% relative to an area of one leaf.
(f) 5—Area of lesion is more than 80% and up to 100% relative to an area of one leaf.

Experiment 5.—Effect on leaf mould of tomato

Method for test:

*Cladosporium fulvum* Cooke is incubated in a potato medium at 28° C. for 20 days. Then conidia are suspended in water in a rate of 8–10×10$^5$/ml.

Tomato variety Ponderosa reared in a pot of 12 cm. diameter for about 1 month is employed for the test. The test is repeated 2 times by employing 5 pots per one plot.

10 ml./pot of the suspension of (A) or (B) is sprayed onto the tomato. Then, after the tomato is dried, 3 ml./pot of the suspension of conidia is inoculated on thus treated tomato.

14 days after the inoculation, the morbidity degree in the leaves is measured.

Results:

| | Concentration ($\mu$g./ml.) of the suspension of (A) or(B) (calculated as Cu) | Number of leaves tested | Morbiidty degree* (percent) |
|---|---|---|---|
| Treated plot: | | | |
| (A) | 575 | 30 | 9 |
| | 383 | 30 | 11 |
| | 288 | 30 | 12 |
| (B) | 575 | 30 | 5 |
| | 383 | 30 | 10 |
| | 288 | 30 | 12 |
| Non-treated plot | | 30 | 45 |

*Morbidity degree = $\left\{ \Sigma \dfrac{(f) \times \text{number of leaves}}{\text{Number of leaves tested}} \right\} \times 100$ (f) 0—No lesion per one leaf.
(f) 1—Area of lesion is up to 20% of an area of one leaf.
(f) 2—Area of lesion is more than 20% and up to 40% of an area of one leaf.
(f) 3—Area of lesion is more than 40% and up to 60% of an area of one leaf.
(f) 4—Area of lesion is more than 60% and up to 80% of an area of one leaf.
(f) 5—Area of lesion is more than 80% and up to 100% of an area of one leaf.

Experiment 6.—Effect on black spot of pear

Method for test:

*Alternaria kikuchiana* Tanaka is previously incubated in a potato-agar medium at 28° C. for 14 days.

Detached new branch (5 leaves/branch) of pear variety Nijisseiki (three–five-year-old plant) which is put in a 200 ml. of flask filled with water, is employed for the test. The test is carried out by employing 4 branches per one plot.

The suspension of (A) or (B) is sprayed onto the branch in a rate of 10 ml./branch. Then, after drying, 0.5 mm. diameter of the block of the culture medium of *Alternaria kikuchiana* Tanaka is put on the middle position of the leaves. 7 days after the inoculation, the expansion rate of *Alternaria kikuchiana* Tanaka is measured.
Result:

| | Concentration (μg./ml.) of the suspension of (A) or (B) (calculated as Cu) | Average area of lesions (cm.) | Expansion rate* (percent) |
|---|---|---|---|
| Treated-plot: | | | |
| (A) | 575 | 0.1 | 11 |
| | 383 | 0.5 | 56 |
| | 288 | 0.5 | 56 |
| (B) | 575 | 0.3 | 33 |
| | 383 | 0.4 | 44 |
| | 288 | 0.5 | 56 |
| Non-treated plot | | 0.9 | 100 |

*Expansion rate = $\frac{\text{Average area of lesions in the treated plot}}{\text{Average area of lesions in the non-treated plot}} \times 100$ Experiment 7.—Effect on citrus melanose of citrus unshin Method for test:

*Phomopsis citri* Fawcett is inoculated onto branches of 5 mm. diameter and 10 cm. length of Citrus unshin and incubated at 28° C. for about one month.

Young plant of Citrus unshin (3 years old) is employed for the test. The test is carried out by employing 5 branches per one plot.

The suspension of (A) or (B) is sprayed onto the Citrus unshin at a rate of 50 ml./branch. Then after being dried, the branch which was attacked with *Phomopsis citri* Fawcett is hung on the branch of young plant of Citrus unshin for the purpose of inoculating *Phomopsis citri* Fawcett on the young plant of Citrus unshin.

25 days after the inoculation, the number of all the lesions is observed.

Result:

| | Concentration (μg./ml.) of the suspension of (A) or (B) (calculated as Cu) | Number tested of leaves | Number of all the lesions | Morbidity rate* (percent) |
|---|---|---|---|---|
| Treated-plot: | | | | |
| (A) | 575 | 10 | 82 | 7 |
| | 383 | 10 | 148 | 12 |
| | 288 | 10 | 308 | 25 |
| (B) | 575 | 10 | 136 | 11 |
| | 383 | 10 | 309 | 25 |
| | 288 | 10 | 370 | 30 |
| Non-treated plot | | 10 | 1,232 | 100 |

*Morbidity rate = $\frac{\text{Number of lesions in the treated plot}}{\text{Number of lesions in the non-treated plot}} \times 100$ In practice, the basic copper sulfate of this invention may be applied to plants as it is or in a form of compositions such as dust, emulsion, suspension or solution.

The compositions may be readily prepared ab initio or may, e.g., be in the form of concentrates comprising the basic copper sulfate of this invention with only a minor amount of an adjuvant, e.g., a surface active agent, extender, etc. Such a concentrate is economical as regards transportation, storage and the like, and may easily be mixed prior to use with additional adjuvant to give the desired concentration of the basic copper sulfate of this invention when it is applied. The adjuvant may be selected depending on plants to be treated, other adjuvant to be used together therewith, and conditions of use, etc.

When the compositions are used in dust form, the adjuvant (or diluent) may be, e.g., talc, clay, diatomaceous earth, lime, calcium sulfate, kaolin, soybean powder, alumina, active charcoal and the like.

When the compositions are used in the form of liquid, the adjuvant (diluent) is e.g., water.

The compositions may further contain wetting agents, dispersing agetns and emulsifiers such as suitable surface active agents, e.g., polyoxyethylene-glycolethers, polyoxyethyleneglycolesters, polyoxyethylene derivatives of sorbitan monolaurate (monostearate), polyoxyethylenealkylarylether, alkyl sulfonate, alkylarylsulfonate, alkyl sulfosuccinate, etc. If necessary, casein, gelatin, starch, alginic acid, agar, carboxymethylcellulose, polyvinyl alcohol, rice bran oil, bentonite, etc., may be employed. They may also contain adherent or sticking agents, and also other agricultural chemicals, e.g., pesticides, fungicides, manure or fertilizer, growth controlling agents, plant hormone, etc., all these materials being considered "adjuvants."

It is within the scope of the present invention to employ other adjuvants than these hereinbefore mentioned—e.g., solid or liquid diluents, emulsifiers, dispersants, surface active agents or otherwise—those already mentioned being merely illustrative.

The effective amount of the basic copper sulfate of this invention may vary with the kind, stage or condition of plants, kind of plant diseases, time at which the basic copper sulfate of this invention is applied, etc. However, in general it may be sufficient to employ 10–500 grams calculated as copper per 10 ares.

Example 1

To an aqueous solution of 50 g. of trisodium phosphate ($Na_3PO_4 \cdot 12H_2O$) in 880 ml. of water are added simultaneously an aqueous solution of 1.1 kg. of copper sulphate ($CuSO_4 \cdot 5H_2O$) in 4.95 l. of water, and 4.95 l. of 1.5 N sodium hydroxide with stirring for 25 minutes. Then, the resultant mixture is kept stirring for 30 minutes. Precipitates thus formed are collected by filtration, washed with water and then dried at 100° C. to yield 508 g. of pale fine powder.

Analysis.—Cu, 54.93%; $SO_4$, 16.15%; $PO_4$, 2.61%; $H_2O$, 3.10%.

Throughout this specification, the abbreviations "mm.," "ml.," "cm.," "μg.," "g.," "kg.," and "l." represent, respectively, "millimeter(s)," "milliliter(s)," "centimeter(s)," "microgram(s)," "gram(s)," "kilogram(s)," and "liters."

Figure 2:
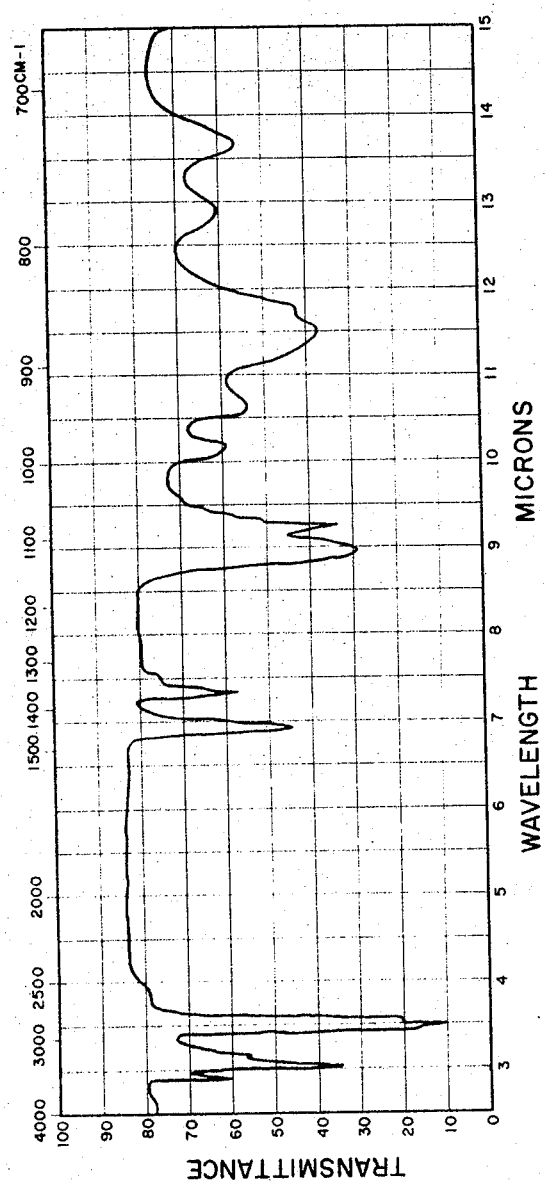
Figure 3:
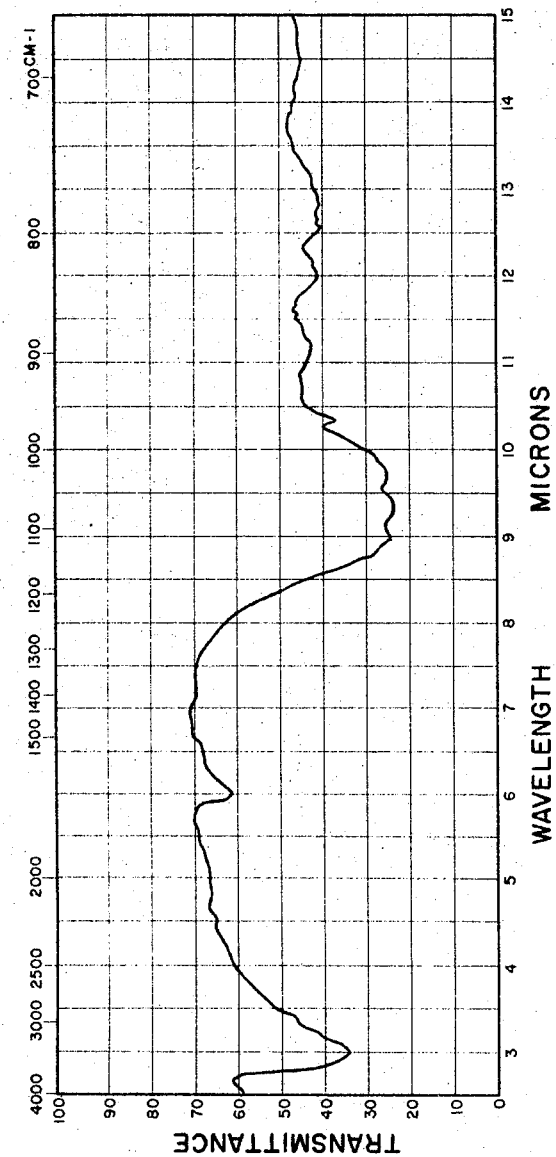

FIGURES 1, 2 and 3 show, respectively, infrared absorption spectrum of the basic copper sulfate prepared in Example 1, that of brochantite-type basic copper sulfate and that of langite. The spectrum of the basic copper sulfate prepared in Example 1 or of brochantite-type basic copper sulfate is obtained with liquid paraffin mull technique, while that of langite is obtained with potassium bromide technique. As is shown in these figures, the basic copper sulfate prepared in Example 1 has different absorption pattern from that of brochantite-type basic copper sulfate or of langite at around 3μ, 9–9.5μ and 10–14μ, which are respectively, due to the stretching vibration of OH, the stretching vibration of $SO_4$ and to the bending vibration of OH. Further, while basic copper sulfate prepared in Example 1 shows an absorption band at 6.05μ due to $H_2O$, brochantite-type basic copper sulfate has no such absorption band.

Figure 4:
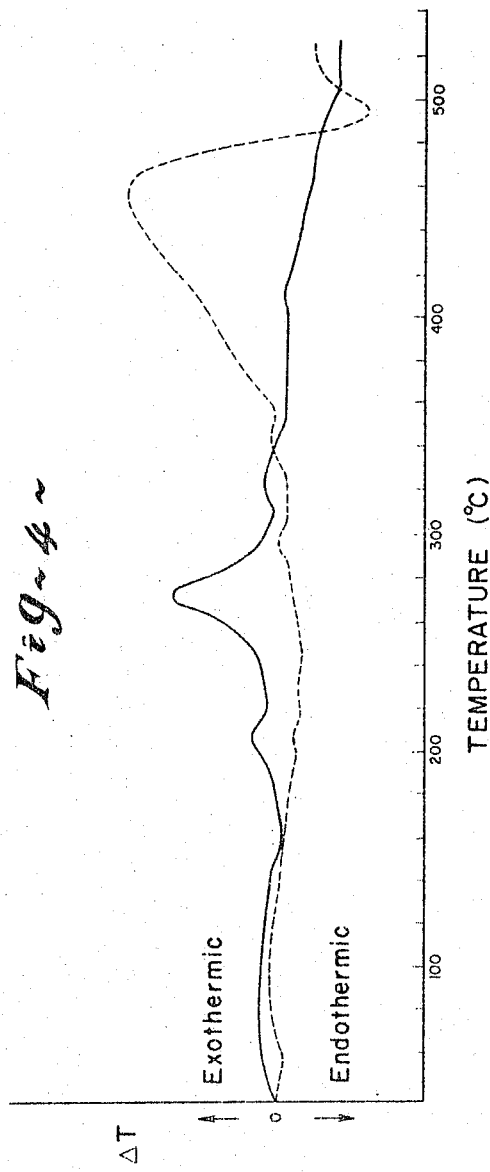

FIGURE 4 shows thermogram of the basic copper sulfate prepared in Example 1 and of brochantite-type basic copper sulfate, wherein the solid line shows thermogram of the basic copper sulfite prepared in Example 1, and the dotted line shows that of brochantite-type basic copper sulfate. As is clearly shown in the figure, while brochantite-type basic copper sulfate is very stable to heat, the decomposition (dehydration) occurs at a relatively low temperature in the basic copper sulfate prepared in Example 1.

Figure 5:
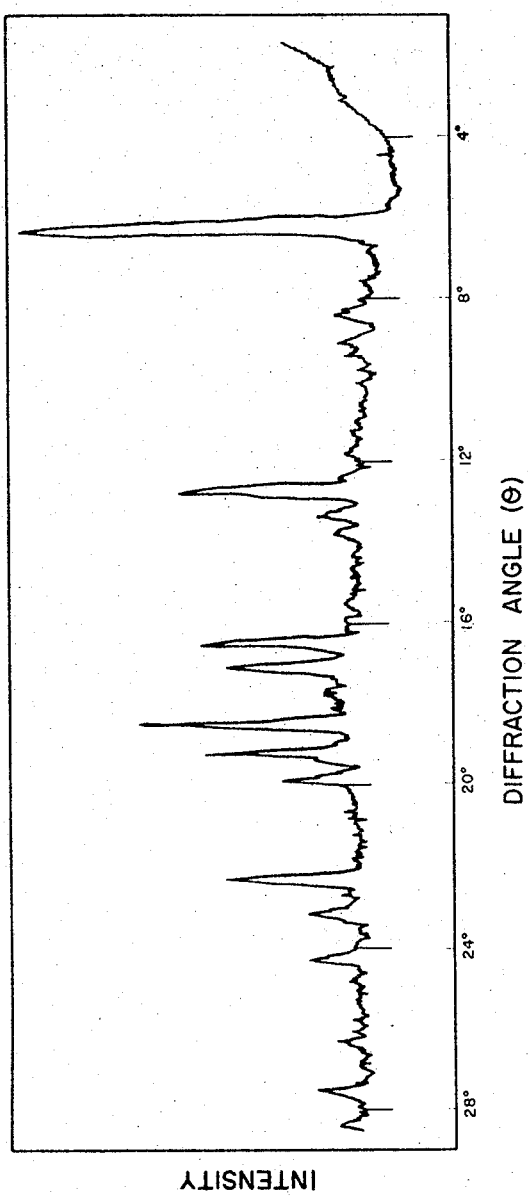

FIGURES 5 and 6 show X-ray diffraction patterns of the basic copper sulfate prepared in Example 1 and of brochantite-type basic copper sulfate, respectively.

Example 2

A powder composition according to the invention comprises 0.3% of aluminum stearate, 88.7 parts of talc and 11% (corresponding to 6% calculated as copper) of fine pale powder product prepared according to Example 1.

Example 3

A wetting powder composition according to the invention comprises 4% of sodium dimethyl, 11% of clay, and 85% (corresponding to 44% calculated as copper) of fine pale powder prepared according to Example 1.

What is claimed is:
1. A fungicidal composition consisting essentially of the basic copper sulfate of the formula

$$Su_4(OH)_6SO_4 \cdot H_2O$$

containing 0.15 to 9% by weight of basic copper phosphate (calculated as $PO_4$), said basic copper sulfate having the following lattice spacings:

Angstrom:
| | |
|---|---|
| 6.95 | Very strong |
| 3.47 | Middle |
| 2.70 | Middle |
| 2.62 | Middle |
| 2.42 | Middle |
| 2.33 | Middle |
| 2.26 | Middle |
| 2.02 | Middle |
| 1.99 | Middle |
| 1.54 | Weak |

2. Fungicidal composition consisting essentially of a major proportion of:
(1) fungicide consisting of the basic copper sulfate of the formula $$Cu_4(OH)_6SO_4 \cdot H_2O$$

containing 0.15 to 9% by weight of basic copper phosphate (calculated as $PO_4$), said basic copper sulfate having the following lattice spacings:

Angstrom:
| | |
|---|---|
| 6.95 | Very strong |
| 3.47 | Middle |
| 2.70 | Middle |
| 2.62 | Middle |
| 2.42 | Middle |
| 2.33 | Middle |
| 2.26 | Middle |
| 2.02 | Middle |
| 1.99 | Middle |
| 1.54 | Weak | and
(2) a minor proportion of at least one fungicide adjuvant.

3. Fungicidal composition consisting essentially of a minor proportion of:
(1) fungicide consisting of the basic copper sulfate of the formula $$Cu_4(OH)_6SO_4 \cdot H_2O$$

containing 0.15 to 9% by weight of basic copper phosphate (calculated as $PO_4$), said basic copper sulfate having the following lattice spacings:

Angstrom:
| | |
|---|---|
| 6.95 | Very strong |
| 3.47 | Middle |
| 2.70 | Middle |
| 2.62 | Middle |
| 2.42 | Middle |
| 2.33 | Middle |
| 2.26 | Middle |
| 2.02 | Middle |
| 1.99 | Middle |
| 1.54 | Weak | and
(2) a major proportion of at least one fungicide adjuvant.

4. Fungicide consisting of the basic copper sulfate of the formula $$Cu_4(OH)_6SO_4 \cdot H_2O$$

containing 0.15 to 9% by weight of basic copper phosphate (calculated as $PO_4$), said basic copper sulfate having an infrared absorption spectrum according to FIG. 1 of the accompanying drawings, a thermogram according to the solid line curve shown in FIG. 4, and following lattice spacings:

Angstrom:
| | |
|---|---|
| 6.95 | Very strong |
| 3.47 | Middle |
| 2.70 | Middle |
| 2.62 | Middle |
| 2.42 | Middle |
| 2.33 | Middle |
| 2.26 | Middle |
| 2.02 | Middle |
| 1.99 | Middle |
| 1.54 | Weak |

References Cited

UNITED STATES PATENTS

| | | | |
|---|---|---|---|
| 1,749,575 | 3/1930 | Engelmann | 107—16 |
| 1,937,524 | 12/1933 | Marsh | 23—125 |
| 1,954,171 | 4/1934 | Goldsworthy | 107—16 |
| 2,206,889 | 7/1940 | Gulbrandsen | 23—125 |
| 2,370,157 | 2/1945 | Furness | 23—125 |
| 2,493,262 | 1/1950 | Porvasnik | 23—125 |
| 2,758,013 | 8/1956 | Munekata | 23—125 |
| 2,639,220 | 5/1953 | Thomsen | 23—125 |
| 3,025,136 | 3/1962 | Hirao | 23—125 |
| 2,051,910 | 8/1936 | Sessions | 167—16 |
| 2,962,416 | 11/1960 | Taylor | 167—16 |

OTHER REFERENCES

Gauthier: Chem. Abstracts, vol. 53 (1959), page 18707E, P.O.S.L.

ALBERT T. MEYERS, Primary Examiner
S. J. FRIEDMAN, Assistant Examiner